US012763332B2

(12) United States Patent
Kumakura et al.

(10) Patent No.: US 12,763,332 B2
(45) Date of Patent: Oct. 13, 2026

(54) POSITIVE ELECTRODE

(71) Applicant: UMICORE, Brussels (BE)

(72) Inventors: Shinichi Kumakura, Olen (BE); Jihoon Kang, Chungcheongnam-do (KR)

(73) Assignee: UMICORE, Brussels (BE)

(*) Notice: Subject to any disclaimer, the term of this patent is extended or adjusted under 35 U.S.C. 154(b) by 580 days.

(21) Appl. No.: 18/268,339

(22) PCT Filed: Dec. 23, 2021

(86) PCT No.: PCT/EP2021/087507

§ 371 (c)(1),
(2) Date: Jun. 20, 2023

(87) PCT Pub. No.: WO2022/136648

PCT Pub. Date: Jun. 30, 2022

(65) Prior Publication Data

US 2024/0047679 A1 Feb. 8, 2024

(30) Foreign Application Priority Data

Dec. 24, 2020 (EP) .................................... 20217309
Dec. 24, 2020 (EP) .................................... 20217310

(51) Int. Cl.
*H01M 4/00* (2006.01)
*C08G 77/46* (2006.01)
(Continued)

(52) U.S. Cl.
CPC .............. *H01M 4/62* (2013.01); *C08G 77/46* (2013.01); *H01M 4/505* (2013.01); *H01M 4/525* (2013.01);
(Continued)

(58) Field of Classification Search
CPC ............. H01M 4/525; H01M 10/0565; H01M 10/0525
See application file for complete search history.

(56) References Cited

U.S. PATENT DOCUMENTS

| | | | | |
|---|---|---|---|---|
| 4,962,218 A | 10/1990 | Blevins et al. | | |
| 2003/0023001 A1* | 1/2003 | Kerr | H01M 10/052 | 525/242 |

FOREIGN PATENT DOCUMENTS

| | | | | |
|---|---|---|---|---|
| EP | 2828692 A1 | 1/2015 | | |
| EP | 3633775 A1 * | 4/2020 | H01M 4/806 | |

(Continued)

OTHER PUBLICATIONS

Anani, Solid Polymer Matrix Electrolyte (PME) for Rechargeable Lithium Batteries and Batteries Made Therewith, Feb. 2020, See the Abstract. (Year: 2020).*

(Continued)

*Primary Examiner* — Tiffany Legette
*Assistant Examiner* — Monique M Wills
(74) *Attorney, Agent, or Firm* — Rimon P.C.; Allyn B. Elliott

(57) ABSTRACT

A positive electrode for lithium-ion secondary batteries, comprising a positive electrode active material and at least one polymer electrolyte being polyether polymer, said positive electrode active material comprising at least elements selected from Li, M', and oxygen, wherein the metal M' has a formula: $Ni_{1-x-y-z}Mn_xCo_yA_z$ with $0.00 \leq x \leq 0.70$, $0.00 \leq y \leq 0.40$, and $0.00 \leq z \leq 0.10$, wherein A, when present, is different than Ni, Mn, Co and Li, and is preferably at least one of: B, Mg, Al, Nb, Ti, Y, W, S, Ba, Sr, and Zr.

17 Claims, 1 Drawing Sheet

(51) Int. Cl.

| | |
|---|---|
| ***H01M 4/505*** | (2010.01) |
| ***H01M 4/525*** | (2010.01) |
| ***H01M 4/62*** | (2006.01) |
| ***H01M 10/0525*** | (2010.01) |
| ***H01M 10/0565*** | (2010.01) |
| *H01M 4/02* | (2006.01) |

(52) U.S. Cl.

CPC ... *H01M 10/0525* (2013.01); *H01M 10/0565* (2013.01); *H01M 2004/028* (2013.01); *H01M 2300/0082* (2013.01)

(56) References Cited

FOREIGN PATENT DOCUMENTS

| | | | | |
|---|---|---|---|---|
| JP | 2003197030 A | | 7/2003 | |
| WO | WO-2020033538 A1 | * | 2/2020 | ........ H01M 10/0585 |

OTHER PUBLICATIONS

Yamashita et al., Positive Electrode Active Material Complex for Lithium-Ion Secondary Battery, Secondary Battery Using Same, and Method for Producing Positive Electrode Active Material Complex for Lithium-Ion Secondary Battery, Apr. 2020, See the Abstract. (Year: 2020).*

ISA/EPO, International Search Report and Written Opinion in International application No. PCT/EP2021/087507 dated Feb. 11, 2022, 11 Pages.

Ni, Jianlong et al., Synthesis of a Novel Polysiloxane-based Polymer Electrolyte and its Ionic Conductivity, Polymers for Advanced Technologies, 1992, pp. 80-84, vol. 4.0

Zhang, Zhengcheng, et al., "Novel network polymer electrolytes based on polysiloxane with internal plasticizer", Electrochimica Acta 45, 2000, pp. 2131-2138.

* cited by examiner

POSITIVE ELECTRODE

CROSS-REFERENCE TO RELATED APPLICATIONS

This application is a U.S. National Stage application of International Patent Application No. PCT/EP2021/087507, filed on Dec. 23, 2021, which claims the benefit of European Patent Application No. 20217309.2, filed on Dec. 24, 2020, and European Patent Application No. 20217310.0, filed on Dec. 24, 2020.

FIELD OF THE INVENTION

The present invention relates to a positive electrode comprising a positive electrode active material and at least one polymer electrolyte for lithium-ion secondary batteries.

BACKGROUND OF THE INVENTION

Polymer electrolytes are interesting alternatives to liquid electrolytes in batteries. In that context, polyethylene oxide (PEO) based electrolytes have been extensively studied in the literature.

For examples, Ruoyuan Tao et al. in J. Appl. Electrochem. 35, 163-168 (2005) discloses a positive electrode comprising poly(ethylene oxide) and lithium bis(trifluoromethanesulfonyl)imide ($Li(N(SO_2CF_3)_2)$), also called LiTFSI. PEO and LiTFSI were dissolved in acetonitrile in order to prepare an electrolyte solution. A positive electrode active material was added to the electrolyte solution.

U.S. Pat. No. 7,585,934 B2 discloses the use of EO/PO/AGE and lithium bis(trifluoromethanesulfonyl)imide (LiTFSI, $Li(N(SO_2CF_3)_2)$) as a solid polymer electrolyte film. This document discloses in the working examples a copolymerization procedure of EO, PO, and AGE. In particular, LiTFSI was added as a Li salt to polyether polymer composition comprising said EO/PO/AGE copolymer, in an amount such that a ratio of (mol number of lithium atom in the electrolyte salt)/(mol number of oxygen atom in the polyether polymer) was 0.05.

Despite the recent advances in the field, capacity leak remains a problem for positive electrode comprising a PEO based solid electrolytes. Capacity leak is a phenomenon according to which the electrolyte gains electronic conductivity which causes the electronic current to leak from the anode to the cathode.

There is thus a need for improved positive electrodes, particularly positive electrodes with reduced capacity leak when used in batteries.

SUMMARY OF THE INVENTION

The inventors have surprisingly found that it is possible to provide a positive electrode fulfilling the above mentioned needs.

Thus, the primary object of the present invention is a positive electrode for lithium-ion secondary batteries, comprising a positive electrode active material and at least one polymer electrolyte, said positive electrode active material comprising at least Li, M', and oxygen elements, wherein M' consists of Ni, Mn, Co and A, said positive electrode material having a Ni:(Mn+Co+A) molar (or atomic) ratio of $(1-x-y-z):(x+y+z)$ wherein $0.00 \leq x \leq 0.70$, $0.00 \leq y \leq 0.40$, and $0.00 \leq z \leq 0.10$ as measured by ICP, wherein A, when present, is different than Ni, Mn, Co and Li, and is preferably Al or at least one of: B, Mg, Al, Nb, Ti, Y, W, S, Ba, Sr, and Zr, and said polymer electrolyte being obtained by reaction between:

i. at least one polyether polymer [polymer (P), herein after], said polymer (P) comprising:
a) at least 70.0% by moles of oxyethylene units (EO);
b) from 0.0 to 10.0% by moles of oxypropylene units (PO); and
c) from 1.00 to 4.0% by moles of recurring units derived from at least one monomer [hereafter, monomer (M)] of general formula (I) or of general formula (II):

formula (I)

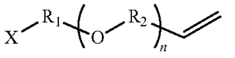

or formula (II)

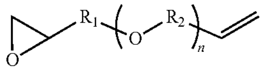

wherein each of R1 and R2, equal to or different from each other and at each occurrence, is C1-6 alkanediyl wherein said C1-6 alkanediyl, is optionally substituted with one or more substituents selected from halide, C1-4 alkyl, C3-6 cycloalkyl, CF3, OR8, and wherein each of R8, equal to or different from each other and at each occurrence, is independently selected from the group hydrogen and C1-4 alkyl; n is an integer 0 or 1 or 2;

each of X is a leaving group selected from the group consisting of halide, trifluoromethanesulfonate, nonafluorobutanesulfonate, p-toluenesulfonate and methanesulfonate; and ii. at least one polysiloxane compound having the formula (III):

formula (III)

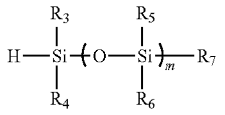

wherein each of R3, R4, R5, R6 and R7, equal to or different from each other and at each occurrence, is independently selected from the group consisting of C1-6 alkyl, C3-6 cycloalkyl, aryl, C1-6 alkoxy, heterocyclyl, wherein said C1-6 alkyl, C3-6 cycloalkyl, aryl, C1-6 alkoxy, heterocyclyl are optionally substituted with one or more substituents selected from halide, C1-4 alkyl, C3-6 cycloalkyl, CF3, OR9, and wherein each of R9, equal to or different from each other and at each occurrence, is independently selected from the group consisting of hydrogen, C1-4 alkyl, and an hydroxyl protecting group, m is an integer of at least 3; and wherein said at least one polysiloxane compound having the formula (III) is grafted to said at least one polymer (P) through reaction of at least a fraction of the —CH═CH2 moiety of monomer (M) with the H—Si moiety of the polysiloxane compound having the formula (III).

A second object of the present invention concerns a positive electrode for lithium-ion secondary batteries, comprising a positive electrode active material and at least one polymer electrolyte, said positive electrode active material comprising at least elements selected from Li, M', and oxygen, wherein the metal M' has a formula: $Ni_{1-x-y-z}Mn_{x}Co_{y}A_{z}$ with $0.00 \leq x \leq 0.70$, $0.00 \leq y \leq 0.40$, and $0.00 \leq z \leq 0.10$ as measured by ICP, wherein A, when present, is different than Ni, Mn, Co and Li, and is preferably at least one of: B, Mg, Al, Nb, Ti, Y, W, S, Ba, Sr, and Zr, and said polymer electrolyte being obtained by reaction between:

i. at least one polyether polymer [polymer (P), herein after], said polymer (P) comprising:
   a) at least 70.0% by moles of oxyethylene units (EO);
   b) from 0.0 to 10.0% by moles of oxypropylene units (PO); and
   c) from 1.00 to 4.0% by moles of recurring units derived from at least one monomer [hereafter, monomer (M)] of general formula (I) or of general formula (II):

formula (I)

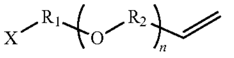

or formula (II)

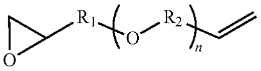

wherein each of $R_1$ and $R_2$, equal to or different from each other and at each occurrence, is $C_{1-6}$ alkanediyl wherein said $C_{1-6}$ alkanediyl, is optionally substituted with one or more substituents selected from halide, $C_{1-4}$ alkyl, $C_{3-6}$ cycloalkyl, $CF_3$, $OR_8$, and wherein each of $R_8$, equal to or different from each other and at each occurrence, is independently selected from the group hydrogen and $C_{1-4}$ alkyl; n is an integer 0 or 1 or 2;

each of X is a leaving group selected from the group consisting of halide, trifluoromethanesulfonate, nonafluorobutanesulfonate, p-toluenesulfonate and methanesulfonate;

and ii. at least one polysiloxane compound having the formula (III):

formula (III)

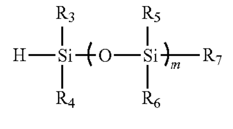

wherein each of $R_3$, $R_4$, $R_5$, $R_6$ and $R_7$, equal to or different from each other and at each occurrence, is independently selected from the group consisting of $C_{1-6}$ alkyl, $C_{3-6}$ cycloalkyl, aryl, $C_{1-6}$ alkoxy, heterocyclyl, wherein said $C_{1-6}$ alkyl, $C_{3-6}$ cycloalkyl, aryl, $C_{1-6}$ alkoxy, heterocyclyl are optionally substituted with one or more substituents selected from halide, $C_{1-4}$ alkyl, $C_{3-6}$ cycloalkyl, $CF_3$, $OR_9$, and wherein each of $R_9$, equal to or different from each other and at each occurrence, is independently selected from the group consisting of hydrogen, $C_{1-4}$ alkyl, and an hydroxyl protecting group, m is an integer of at least 3; and wherein said at least one polysiloxane compound having the formula (III) is grafted to said at least one polymer (P) through reaction of at least a fraction of the $-CH{=}CH_2$ moiety of monomer (M) with the H—Si moiety of the polysiloxane compound having the formula (III).

It is a further object of the present invention to provide a polymer battery comprising said positive electrode.

It is a further object of the present invention to provide an electrochemical cell comprising said positive electrode.

It is a further object of the present invention to provide a use of said positive electrode in a battery.

DETAILED DESCRIPTION OF THE INVENTION

The Positive Electrode

Figure 1:
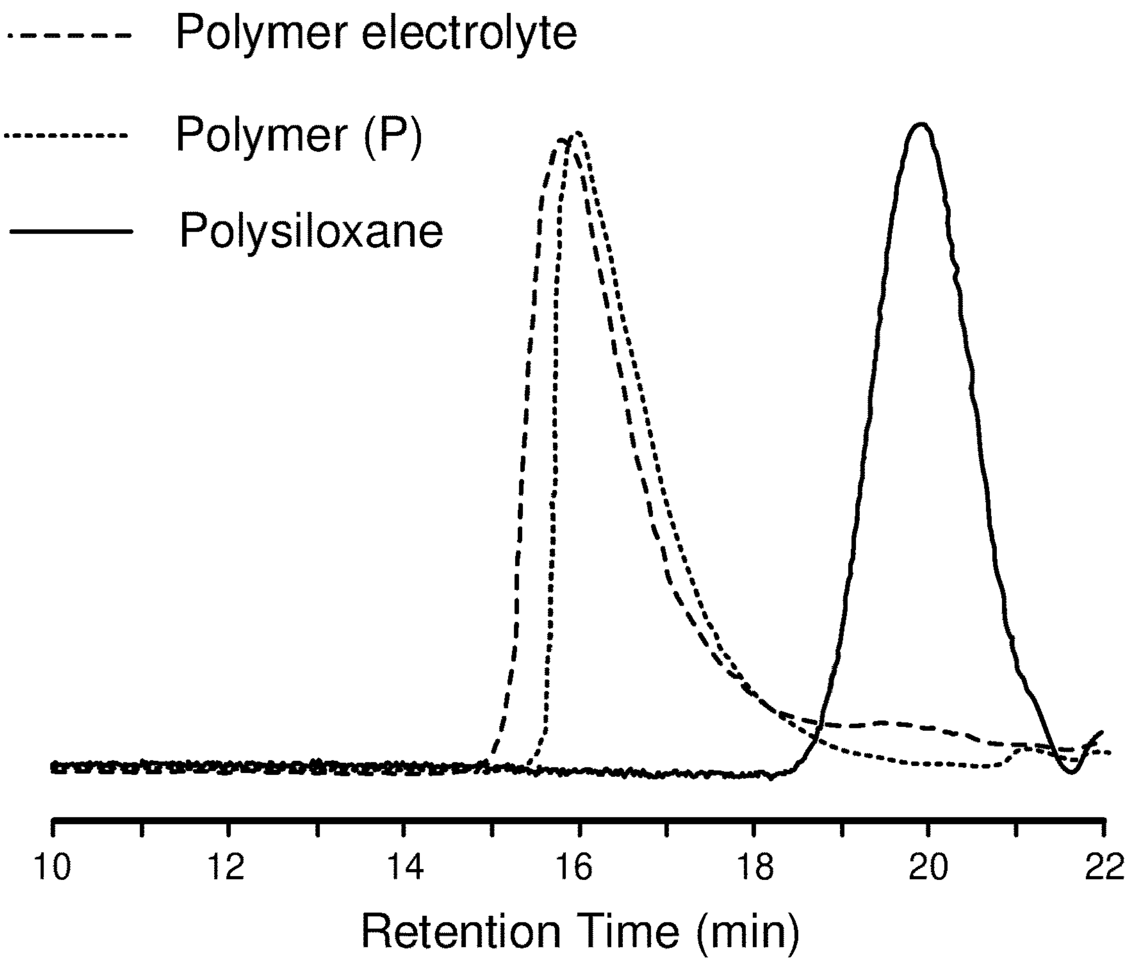
FIG. 1 is a graph that shows GPC elution curves of the polymer electrolyte as prepared above, polymer (P) and the polysiloxane.

The term "comprising", as used herein and in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a composition comprising components A and B" should not be limited to compositions consisting only of components A and B. It means that with respect to the present invention, the only relevant components of the composition are A and B. Accordingly, the terms "comprising" and "including" encompass the more restrictive terms "consisting essentially of" and "consisting of".

As used herein, the terms "optional" or "optionally" means that a subsequently described event or circumstance can or cannot occur, and that the description includes instances where said event or circumstance occurs and instances where it does not.

The terms "positive electrode active material" are intended to denote a material which is electrochemically active in a positive electrode. The active material is capable to capture and release Li ions when subjected to a voltage change over a predetermined period of time.

The inventors have surprisingly found that when the positive electrode according to the present invention is used in a battery, in particular in solid-state lithium-ion batteries, capacity leaking is reduced which resulted in a battery with improved performance, as demonstrated in the working examples.

Within the context of the present invention, the term "a positive electrode active material" is defined as a material which is electrochemically active in a positive electrode. The active material is capable to capture and release Li ions when subjected to a voltage change over a predetermined period of time.

Within the context of the present invention, the expression "at least one polyether polymer [polymer (P), herein after)" is intended to denote one or more than one polymer (P). Similarly the expression "at least one polysiloxane compound having the formula (III)" and "at least one polymer electrolyte" is intended to denote one or more than one polysiloxane compound having the formula (III) and respectively one or more than one polymer electrolyte.

In the rest of the text, the expressions "polymer (P)", "polymer electrolyte" and "polysiloxane compound having the formula (III)" is understood, for the purposes of the present invention, both in the plural and the singular.

As used herein the term "alkyl" has the broadest meaning generally understood in the art, and may include a moiety which is linear or branched, or a combination thereof.

The term "alkyl"—alone or in combination means a straight or branched alkane-derived radical, for example, CF-G alkyl defines a straight or branched alkyl radical having from F to G carbon atoms, e.g. $C_{1-4}$ alkyl defines a straight or branched alkyl radical having from 1 to 4 carbon atoms such as for example methyl, ethyl, 1-propyl, 2-propyl (isopropyl), 1-butyl, 2-butyl, 2-methyl-2-propyl (tert-butyl), 2-methyl-1-propyl (isobutyl).

The term "cycloalkyl"—alone or in combination means a cyclic alkane-derived radical, for example, CL-M cycloalkyl defines a cyclic alkyl radical having from L to M carbon atoms, e.g. $C_{3-6}$ cycloalkyl defines a cyclic alkyl radical having from 3 to 6 carbon atoms such as for example cyclopropyl, cyclobutyl, cyclopentyl, cyclohexyl and the like.

The term "aryl"—alone or in combination means phenyl, naphthyl or anthracenyl optionally carbocyclic fused with a cycloalkyl or heterocyclyl of preferably 5-7, more preferably 5-6, ring members and/or optionally substituted with 1 to 5 groups or substituent. An aryl may be optionally substituted whereby the substituent is attached at one point to the aryl or whereby the substituent is attached at two points to the aryl to form a bicyclic system e.g. benzodioxole, benzodioxan, benzimidazole.

The term "heterocyclyl"—alone or in combination means a cyclic alkane-derived radical in which at least one carbon atom is replaced by a heteroatom independently selected from the group consisting of oxygen, nitrogen and sulphur, such as pyrrolidine, piperidine or morpholine and the like.

The term "alkoxy"—alone or in combination means a straight or branched alkane-derived radical in which the carbon atom bearing the radical is replaced by an oxygen atom. The alkoxy moiety has a —O—$R_x$ structure wherein $R_x$ is an alkyl.

The term "alkanediyl"—alone or in combination means a straight or branched alkyl derived divalent radical.

A first aspect of the invention provides a positive electrode for lithium-ion secondary batteries, comprising a positive electrode active material and at least one polymer electrolyte, said positive electrode active material comprising Ni, Mn, Co and A, said positive electrode material having a Ni:(Mn+Co+A) molar ratio of (1-x-y-z):(x+y+z) wherein 0.00≤x≤0.70, 0.00≤y≤0.40, and 0.00≤z≤0.10 as measured by ICP, wherein A, when present, is different than Ni, Mn, Co and Li, and is preferably Al or at least one of: B, Mg, Al, Nb, Ti, Y, W, S, Ba, Sr, and Zr, and said polymer electrolyte being obtained by reaction between:

i. at least one polyether polymer [polymer (P), herein after], said polymer (P) comprising:
   at least 70.0% by moles of oxyethylene units (EO);
   from 0.0 to 10.0% by moles of oxypropylene units (PO); and
   from 1.00 to 4.0% by moles of recurring units derived from at least one monomer [hereafter, monomer (M)] of general formula (I) or of general formula (II):

formula (I)

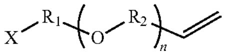

or formula (II)

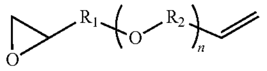

wherein each of $R_1$ and $R_2$, equal to or different from each other and at each occurrence, is $C_{1-6}$ alkanediyl wherein said $C_{1-6}$ alkanediyl, is optionally substituted with one or more substituents selected from halide, $C_{1-4}$ alkyl, $C_{3-6}$ cycloalkyl, $CF_3$, $OR_8$, and wherein each of $R_8$, equal to or different from each other and at each occurrence, is independently selected from the group hydrogen and $C_{1-4}$ alkyl; n is an integer 0 or 1 or 2;

each of X is a leaving group selected from the group consisting of halide, trifluoromethanesulfonate, nonafluorobutanesulfonate, p-toluenesulfonate and methanesulfonate;

and ii. at least one polysiloxane compound having the formula (III):

formula (III)

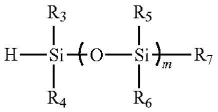

wherein each of $R_3$, $R_4$, $R_5$, $R_6$ and $R_7$, equal to or different from each other and at each occurrence, is independently selected from the group consisting of $C_{1-6}$ alkyl, $C_{3-6}$ cycloalkyl, aryl, $C_{1-6}$ alkoxy, heterocyclyl, wherein said $C_{1-6}$ alkyl, $C_{3-6}$ cycloalkyl, aryl, $C_{1-6}$ alkoxy, heterocyclyl are optionally substituted with one or more substituents selected from halide, $C_{1-4}$ alkyl, $C_{3-6}$ cycloalkyl, $CF_3$, $OR_9$, and wherein each of $R_9$, equal to or different from each other and at each occurrence, is independently selected from the group consisting of hydrogen, $C_{1-4}$ alkyl, and an hydroxyl protecting group, m is an integer of at least 3; and wherein said at least one polysiloxane compound having the formula (III) is grafted to said at least one polymer (P) through reaction of at least a fraction of the —CH═$CH_2$ moiety of monomer (M) with the H—Si moiety of the polysiloxane compound having the formula (III).

Alternatively, an embodiment of the invention provides a positive electrode for lithium-ion secondary batteries, comprising a positive electrode active material and at least one polymer electrolyte, said positive electrode active material comprising at least Li, M', and oxygen elements, wherein M' consists of Ni, Mn, Co and A, said positive electrode material having a Ni:(Mn+Co+A) molar ratio of (1−x−y−z):(x+y+z) wherein 0.00≤x≤0.70, 0.00≤y≤0.40, and 0.00≤z≤0.10 as measured by ICP, wherein A, when present, is different than Ni, Mn, Co and Li, and is preferably Al or at least one of: B, Mg, Al, Nb, Ti, Y, W, S, Ba, Sr, and Zr, and said polymer electrolyte being obtained by reaction between:

i. at least one polyether polymer [polymer (P), herein after], said polymer (P) comprising:
   at least 70.0% by moles of oxyethylene units (EO);
   from 0.0 to 10.0% by moles of oxypropylene units (PO); and
   from 1.00 to 4.0% by moles of recurring units derived from at least one monomer [hereafter, monomer (M)] of general formula (I) or of general formula (II):

formula (I)

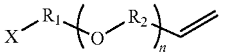

or formula (II)

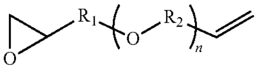

wherein each of $R_1$ and $R_2$, equal to or different from each other and at each occurrence, is $C_{1-6}$ alkanediyl wherein said $C_{1-6}$ alkanediyl, is optionally substituted with one or more substituents selected from halide, $C_{1-4}$ alkyl, $C_{3-6}$ cycloalkyl, $CF_3$, $OR_8$, and wherein each of $R_8$, equal to or different from each other and at each occurrence, is independently selected from the group hydrogen and $C_{1-4}$ alkyl; n is an integer 0 or 1 or 2;

each of X is a leaving group selected from the group consisting of halide, trifluoromethanesulfonate, nonafluorobutanesulfonate, p-toluenesulfonate and methanesulfonate;

and ii. at least one polysiloxane compound having the formula (III):

formula (III)

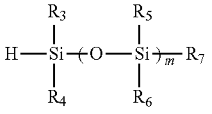

wherein each of $R_3$, $R_4$, $R_5$, $R_6$ and $R_7$, equal to or different from each other and at each occurrence, is independently selected from the group consisting of $C_{1-6}$ alkyl, $C_{3-6}$ cycloalkyl, aryl, $C_{1-6}$ alkoxy, heterocyclyl, wherein said $C_{1-6}$ alkyl, $C_{3-6}$ cycloalkyl, aryl, $C_{1-6}$ alkoxy, heterocyclyl are optionally substituted with one or more substituents selected from halide, $C_{1-4}$ alkyl, $C_{3-6}$ cycloalkyl, $CF_3$, $OR_9$, and wherein each of $R_9$, equal to or different from each other and at each occurrence, is independently selected from the group consisting of hydrogen, $C_{1-4}$ alkyl, and an hydroxyl protecting group, m is an integer of at least 3; and wherein said at least one polysiloxane compound having the formula (III) is grafted to said at least one polymer (P) through reaction of at least a fraction of the $—CH═CH_2$ moiety of monomer (M) with the H—Si moiety of the polysiloxane compound having the formula (III).

As said above, the polymer (P) comprises a) at least 70.0% by moles of the recurring units of the of oxyethylene units (EO);

b) from 0.0 to 10.0% by moles of oxypropylene units (PO); and c) from 1.00 to 4.0% by moles of recurring units derived from at least one monomer [hereafter, monomer (M)] of general formula (I) or of general formula (II):

formula (I)

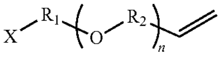

or formula (II)

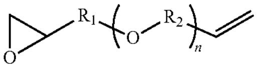

wherein each of $R_1$ and $R_2$, equal to or different from each other and at each occurrence, is $C_{1-6}$ alkanediyl wherein said $C_{1-6}$ alkanediyl, is optionally substituted with one or more substituents selected from halide, $C_{1-4}$ alkyl, $C_{3-6}$ cycloalkyl, $CF_3$, $OR_8$, and wherein each of $R_8$, equal to or different from each other and at each occurrence, is independently selected from the group hydrogen and $C_{1-4}$ alkyl; n is an integer 0 or 1 or 2;

each of X is a leaving group selected from the group consisting of halide, trifluoromethanesulfonate, nonafluorobutanesulfonate, p-toluenesulfonate and methanesulfonate.

Thus, at least 70.0% by moles of the recurring units of the polymer (P) are oxyethylene recurring units (EO), preferably, at least 80.0% by moles, preferably at least 85.0% by moles, preferably at least 90.0% by moles, more preferably at least 92.0% by moles, more preferably at least 94.0% by moles.

It is further understood that, at most 99.0% by moles of the recurring units of the polymer (P) are EO units, more preferably at most 98.5% by moles, more preferably at most 98.0% by moles.

In a preferred embodiment, said polymer (P) comprises at least 80.0% by moles and at most 99.0% by moles, preferably at least 90.0% and at most 98.5% by moles, preferably at least 92.0% and at most 98.5% by moles of EO units, preferably at least 94.0% and at most 98.5% by moles of EO units.

When oxypropylene recurring units (PO) are present in the polymer (P), at most 10.0% by moles of the recurring units of the polymer (P) are PO units, more preferably at most 6.0% by moles, even more preferably at most 5.0% by moles, even more preferably at most 4.0% by moles, even more preferably at most 3.0% by moles.

Advantageously, said polymer (P) comprises at least 0.1% by moles, or at least 0.5% by moles, or at least 1.0% by moles of PO units.

In a preferred embodiment, said polymer (P) comprises at least 0.5% by moles and at most 6.0% by moles, or least 0.5% by moles and at most 5.0% by moles, or at least 0.5% and at most 4.0% by moles, or at least 1.0% and at most 4.0% by moles, or at least 1.0% and at most 3.0% by moles of PO units.

The presence of PO units allows to reduce the crystallinity of the polymer (P), which improvise its ionic conductivity.

For the purpose of the present invention, the term oxypropylene (PO)" is intended to refer to the formula $—O—CH_2—CH_2—CH_2—$ or $—O—CH_2—CH(CH_3)—$, preferrably $—O—CH_2—CH(CH_3)—$.

Preferably, at least 1.2% by moles of the recurring units of the polymer (P) are recurring units derived from the monomer (M) of general formula (I) or of general formula (II), as detailed above, or at least 1.5% by moles, or at least 1.8% by moles, or at least 2.2% by moles.

It is further understood that at most 4.0% by moles of the recurring units of the polymer (P) are recurring units derived from the monomer (M) of general formula (I) or of general formula (II), as detailed above, more preferably at most 3.5% by moles, even more preferably at most 3.0% by moles.

In a preferred embodiment, said polymer (P) comprises at least 1.2% by moles and at most 4.0% by moles, preferably at least 1.5% and at most 3.5% by moles, preferably at least 1.5% and at most 3.0% by moles of recurring units derived from the at least one monomer (M) of general formula (I) or of general formula (II), as detailed above.

When the recurring units in the polymer (P) are derived from the monomer (M) of general formula (II), it is understood that the recurring unit is the result of a ring opening polymerization of the epoxide moiety.

When the recurring units in the polymer (P) are derived from the monomer (M) of general formula (I) with X being an acylchloride or acylbromide, it is understood that the recurring unit can be the result of a reaction between said monomer (M) and terminal OH groups of an EO unit or PO unit, of for example, a dihydroxy terminated polyethylene oxide (or a PEO-co-PPO copolymer) thereby forming an ester moiety.

When the recurring units in the polymer (P) are derived from the monomer (M) of general formula (I) with X being trifluoromethanesulfonate, nonafluorobutanesulfonate, p-toluenesulfonate or methanesulfonate, the recurring unit can be the result of a Williamson type reaction between said monomer (M) and terminal OH groups of an EO unit or PO unit, of for example, a dihydroxy terminated polyethylene oxide (or a PEO-co-PPO copolymer) in the presence of strong base such as NaH thereby forming an ether moiety. via alkolate formation and subsequent substitution of the X moiety of the monomer (M).

These polymerization reactions are known in the art and notably described by H.-Q. Xie, J.-S. Guo, G.-Q. Yu, and J. Zu, in *Journal of Applied Polymer Science* 2001, 80, 2446.

Preferably, each of X in the monomer (M) of general formula (I) is a halide, more preferably a halide selected from the group consisting of chloride, bromide and iodide.

According to a preferred embodiment, the monomer (M) is of formula (II)

formula (II)

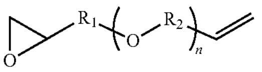

wherein each of $R_1$ and $R_2$, equal to or different from each other and at each occurrence, is a $C_{1-2}$ alkanediyl and n is an integer 0 or 1, preferably n is 1.

In another preferred embodiment of the positive electrode for lithium-ion secondary batteries, the monomer (M) according to the present invention is chosen among those of formulae ($I_A$) to ($I_F$) and ($II_A$) to ($II_E$):

formula ($II_A$)

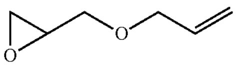

-continued formula ($II_B$)

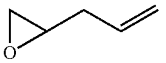

formula ($II_C$)

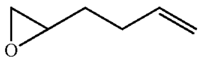

formula ($II_D$)

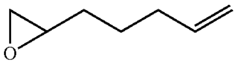

formula ($II_E$)

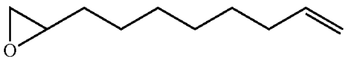

formula ($I_A$)

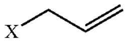

formula ($I_B$)

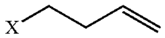

formula ($I_C$)

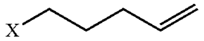

formula ($I_D$)

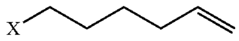

formula ($I_E$)

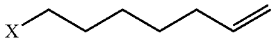

formula ($I_F$)

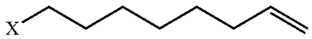

wherein X is selected from the group consisting of halide, trifluoromethanesulfonate, nonafluorobutanesulfonate, p-toluenesulfonate and methanesulfonate, acylchoride, acylbromide. Preferably X is an halide, more preferably an halide selected from the group consisting of chloride, bromide, iodide. Even more preferably X is a bromide.

More preferably, the monomer (M) according to the present invention is a compound chosen among those of formulae ($I_A$) to ($I_F$).

Most preferably, said monomer (M) is a compound of formula ($I_A$).

According to a preferred embodiment of the positive electrode for use in lithium-ion secondary batteries, the polymer (P) consist essentially of;

a) from 94.0 to 98.5 by moles of EO recurring units;

b) from 0.5 to 3.0% by moles of PO recurring units; and c) from 1.0 to 3.0% by moles of recurring units derived from the monomer (M) of general formula (II):

formula (II)

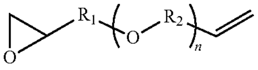

wherein each of $R_1$ and $R_2$, equal to or different from each other and at each occurrence, is a $C_{1-2}$ alkanediyl and n is an integer 0 or 1, preferably n is 1. It is understood that chain defects, or very minor amounts of other units might be present, being understood that these latter do not substantially modify the properties of polymer (P).

Preferably, said polymer (P), as detailed above, has an Mw (weight average molecular weight) of at least 10 000 g/mol, more preferably at least 20 000 g/mol, even more preferably at least 40 000 g/mol, even more preferably at least 50 000 g/mol.

It is understood that said polymer (P), as detailed above, preferably has an Mw of at most 150 000 g/mol, more preferably at most 100 000 g/mol.

In a preferred embodiment, said polymer (P), as detailed above, has a Mw of at least 10 000 g/mol and at most 150 000 g/mol, preferably at least 20 000 g/mol and at most 150 000 g/mol, more preferably at least 40 000 g/mol and at most 100 000 g/mol, even more preferably at least 50 000 g/mol and at most 100 000 g/mol.

According to the present invention, the Mw is measured by GPC with a PEO standards calibration. Thus, the mentioned Mw are PEO equivalents.

Alternatively and even preferably, said polymer (P), as detailed above, has an Mn (number average molecular weight) of at least 10 000 g/mol, more preferably at least 20 000 g/mol, even more preferably at least 40 000 g/mol, even more preferably at least 50 000 g/mol.

It is understood that said polymer (P), as detailed above, preferably has an Mn of at most 150 000 g/mol, more preferably at most 100 000 g/mol.

In a preferred embodiment, said polymer (P), as detailed above, has a Mn of at least 10 000 g/mol and at most 150 000 g/mol, preferably at least 20 000 g/mol and at most 150 000 g/mol, more preferably at least 40 000 g/mol and at most 100 000 g/mol, even more preferably at least 50 000 g/mol and at most 100 000 g/mol.

According to the present invention, the Mn is measured by GPC with a PEO standards calibration. Thus, the mentioned Mn are PEO equivalents.

Preferably, the polymer (P) according to the invention is a random or a block copolymer, more preferably a random copolymer.

Preferably, the polymer (P) according to the invention is linear or branched, more preferably linear.

A particularly preferred polymer (P) is a linear random copolymer in which the backbone chain can be notably sketched according to formula (IV):

(IV)

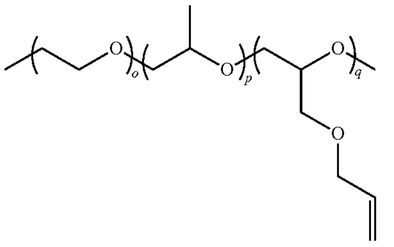

wherein the ratio of o to q (o/q) in the formula (IV) of the polymer (P) is between 25 and 100, or between 35 and 75, or between 40 and 60. The ratio of p to q (p/q) in the formula (IV) of the polymer (P) is advantageously between 0.05 and 1.50, preferably between 0.10 and 1.00, preferably between 0.20 and 0.60.

Such polymers (P) are notably commercially available from Meisei Chemical works ltd under the tradename Alkox® CP-A series.

As said, the polysiloxane compound having the formula (III), formula (III)

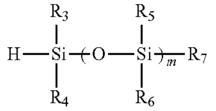

wherein each of $R_3$, $R_4$, $R_5$, $R_6$ and $R_7$, equal to or different from each other and at each occurrence, is independently selected from the group consisting of $C_{1-6}$ alkyl, $C_{3-6}$ cycloalkyl, aryl, $C_{1-6}$ alkoxy, heterocyclyl, wherein said $C_{1-6}$ alkyl, $C_{3-6}$ cycloalkyl, aryl, $C_{1-6}$ alkoxy, heterocyclyl are optionally substituted with one or more substituents selected from halide, $C_{1-4}$ alkyl, $C_{3-6}$ cycloalkyl, $CF_3$, $OR_9$, and wherein each of $R_9$, equal to or different from each other and at each occurrence, is independently selected from the group consisting of hydrogen, $C_{1-4}$ alkyl, and an hydroxyl protecting group, and m is an integer of at least 3;

is grafted to the polymer (P), as detailed above, through reaction of at least a fraction of the —CH═CH$_2$ moiety of monomer (M) with the H—Si moiety of the polysiloxane compound having the formula (III).

Preferably, each of $R_3$ and $R_4$, equal to or different from each other and at each occurrence, is independently $C_{1-6}$ alkyl, more preferably, each of $R_3$ and $R_4$, equal to or different from each other and at each occurrence, is methyl, ethyl, propyl, or isopropyl, even more preferably, each of $R_3$ and $R_4$, equal to or different from each other and at each occurrence, is methyl.

Preferably, each of $R_5$ and $R_6$, equal to or different from each other and at each occurrence, is independently selected from $C_{1-4}$ alkyl or phenyl, wherein said $C_{1-4}$ alkyl is optionally substituted with one or more substituents selected from halide, $C_{1-4}$ alkyl, or $CF_3$, more preferably, each of $R_5$ and $R_6$, equal to or different from each other and at each occurrence, is methyl, ethyl, propyl, or isopropyl, even more preferably, each of $R_5$ and $R_6$, equal to or different from each other and at each occurrence, is methyl.

Preferably, each of $R_7$ is a $C_{1-6}$ alkyl, more preferably, each of $R_7$ is $C_{1-4}$ alkyl such as methyl, ethyl, n-propyl, iso-propyl, n-butyl, iso-butyl or tert-butyl.

Preferably, m is an integer of at least 5, more preferably at least 7, even more preferably at least 8.

It is further understood that m is preferably an integer of at most 1000, more preferably at most 500, even more preferably at most 100, even more preferably at most 20, even more preferably at most 15.

In a preferred embodiment of the present invention, m is an integer of at least 5 and at most 1000, preferably at least 5 and at most 500, more preferably at least 5 and at most 100, eve more preferably at least 5 and at most 20, even more preferably at least 7 and at most 20, even more preferably at least 8 and at most 15.

Within the context of the present invention, it is understood that the —CH═CH$_2$ moiety of monomer (M) is able to react with the H—Si moiety of the polysiloxane compound having the formula (III), as detailed above, so as to obtain a covalent bond between both moieties. Such reaction is in general referred to as a hydrosilylation reaction.

It is further understood that said reaction may involve the formation of one or more intermediates including, metal complexes and sigma complexes.

For reacting, at least a fraction of the —CH═$CH_2$ moiety of monomer (M), as detailed above, with the H—Si moiety of the polysiloxane compound having the formula (III), as detailed above, several techniques known in the art can be successfully used.

Polymer (P), as detailed above, and the polysiloxane having formula (III), as detailed above, can notably be reacted in the molten state; melt compounders such as extruders, melt kneaders or other devices can be advantageously used to this aim.

Polymer (P), as detailed above, and the polysiloxane having formula (III), as detailed above, can notably be reacted in solution; according to this embodiment polymer (P) and the polysiloxane having formula (III), as detailed above, are at least partially dissolved in a solvent. Dissolution can be obtained either at room temperature or preferably, upon heating to a temperature of at least 70° C., more preferably at least 80° C., even more preferably at the reflux temperature of the solvent. The selection of this solvent is not critical, provided that it efficiently solvates both polymer (P) and the polysiloxane having formula (III), as detailed above, and does not interfere with the hydrosilylation reaction. Generally, an organic solvent will be preferably selected. Among these organic solvents, mention can be notably made of benzene, toluene, xylene, cymene and the like.

Further, the polymer (P), as detailed above, and the polysiloxane having formula (III), as detailed above, can notably be reacted in the presence of a catalyst, in particular a hydrosilylation catalyst.

Such hydrosilylation catalysts are known in the art. Mention may be notably made of ruthenium, platinum, or rhodium based catalysts, such as notably a Karstedt's catalyst, Wilkinson catalyst, Speier catalyst and mixtures thereof.

Within the context of the present invention, the expression "through reaction of at least a fraction of the —CH═$CH_2$ of monomer (M) with the H—Si moiety of the polysiloxane compound having the formula (III)" means that only a fraction or the totality of the —CH═$CH_2$ of monomer (M) can react with the H—Si moiety of the polysiloxane compound having the formula (III).

Preferably, said polysiloxane compound having formula (III), as detailed above, is grafted to polymer (P), as detailed above, through reaction of at least 10% by moles, more preferably at least 15% by moles, even more preferably at least 20% by moles, even more preferably at least 25% by moles, even more preferably at least 30% by moles, even more preferably at least 35% by moles, even more preferably at least 40% by moles, even more preferably at least 45% by moles, of the —CH═$CH_2$ moiety of monomer (M) with the H—Si moiety of the polysiloxane compound having the formula (III).

It is further understood that the polysiloxane compound having formula (III), as detailed above, can be grafted to polymer (P), as detailed above, through reaction of 100% by moles, preferably at most 95% by moles, more preferably at most 90% by moles, even more preferably at most 85% by moles, even more preferably at most 80% by moles, even more preferably at most 75% by moles, even more preferably at most 70% by moles, even more preferably at most 65% by moles, even more preferably at most 60% by moles, of the —CH═$CH_2$ moiety of monomer (M) with the H—Si moiety of the polysiloxane compound having the formula (III).

In a preferred embodiment, said polysiloxane compound having formula (III), as detailed above, is grafted to polymer (P), as detailed above, through reaction of at least 10% and at most 90% by moles, more preferably at least 30% and at most 70% by moles, even more preferably at least 40% and at most 60% by moles, of the —CH═$CH_2$ moiety of monomer (M) with the H—Si moiety of the polysiloxane compound having the formula (III).

The reaction can be monitored by using known analytical methods such as notably by using GPC or 1H-NMR methods, as illustrated in the experimental part.

Preferably, said polymer electrolyte is obtained by reaction between said at least one polymer (P) and at least 6 wt. % or at least 7 wt. % or at least 8 wt. % of said at least one polysiloxane compound, with regards to the total amount of said at least one polymer (P) and said at least one polysiloxane compound.

Preferably, said polymer electrolyte is obtained by reaction between said at least one polymer (P) and at most 27 wt. % or at most 25 wt. % or at most 22 wt. % of said at least one polysiloxane compound with regards to the total amount of said at least one polymer (P) and said at least one polysiloxane compound.

In a preferred embodiment, said polymer electrolyte is obtained by reaction between said at least one polymer (P) and at least 6 wt. % and at most 27 wt. % or at least 7 wt. % and at most 25 wt. % or at least 8 wt. % and most 22 wt. % of said at least one polysiloxane compound with regards to the total amount of said at least one polymer (P) and said at least one polysiloxane compound.

As said above, the positive electrode for lithium-ion secondary batteries, comprises a positive electrode active material and at least one polymer electrolyte, said positive electrode active material comprising at least elements selected from: Li, M', and oxygen, wherein the metal M' has a formula: $Ni_{1-x-y-z}Mn_xCo_yA_z$ with $0.00 \leq x \leq 0.70$, $0.00 \leq y \leq 0.40$, and $0.00 \leq z \leq 0.10$ as measured by ICP, wherein A, when present, is different than Ni, Mn, Co and Li, and is preferably at least one of: B, Mg, Al, Nb, Ti, Y, W, S, Ba, Sr, and Zr. Preferably, A is Al having an atomic ratio of A to the total amount of Ni, Mn and/or Co higher than 0, preferably higher than 0.001, more preferably higher than 0.003, most preferably higher 0.006. Preferably A is Al having an atomic ratio of A to the total amount of Ni, Mn and/or Co less than 0.1, preferably less than 0.05, more preferably less than 0.01, most preferably less than 0.008. Preferably A is Al having an atomic ratio of A to the total amount of Ni, Mn and/or Co in a range between 0.001-0.1, preferably in a range between 0.002-0.05, more preferably in a range between 0.003-0.01, most preferably in a range between 0.006-0.008.

According to certain embodiments of the positive electrode of the present invention, the weight ratio of the polymer electrolyte to the positive electrode active material, in the positive electrode according to the present invention is of at least 5%, more preferably at least 10%, even more preferably at least 15%.

Preferably, the weight ratio of the polymer electrolyte to the positive electrode active material in the positive electrode according to the present invention is of at most 50%, more preferably at most 30%, even more preferably at most 25%.

In a preferred embodiment, the weight ratio of the polymer electrolyte to the positive electrode active material in the positive electrode according to the present invention is between 5% and 50%, preferably between 10% and 30%, and more preferably between 15% and 25%. Alternatively, the weight ratio of the polymer electrolyte to the positive electrode active material in the positive electrode according to the present invention is between 5% and 50%, preferably between 20% and 45%, and more preferably between 30% and 40%.

In a preferred embodiment of the positive electrode of the present invention, the positive electrode comprise the polymer electrolyte, as described above, the positive electrode active material, as detailed above, and further comprises at least one lithium salt (Li salt) selected from: LiTFSI, LiFSI, $LiPF_6$, $LiBF_4$, and $LiClO_4$. Such a positive electrode is defined as a catholyte. Optionally, said Li salt is present in said positive electrode in a ratio of a polymer electrolyte:Li salt of 60:40 to 80:20 by weight, more preferably in a ratio 70:30 to 75:25, by weight.

In a preferred embodiment of the positive electrode of the present invention, the [weight ratio×100] of the Li salt to the polymer electrolyte in the positive electrode according to the present invention is between 5% and 50%, preferably between 20% and 45%, and more preferably 30% and 40%.

In another preferred embodiment, the Li salt is LiTFSI.

Preferably, the positive electrode active material, as detailed above, is a particulate material, in particular is a powder.

Battery and Electrochemical Cell

In another aspect, the present invention provides a polymer battery comprising a positive electrode according to the first aspect of the invention.

In another aspect, the present invention provides an electrochemical cell comprising a positive electrode according to the first aspect of the invention.

In another aspect, the present invention provides a use of a positive electrode according to the present invention in a battery.

In a last aspect, the present invention provides a battery or an electrochemical cell comprising a positive electrode active material and a polymer electrolyte, said positive electrode active material comprising at least Li, M', and oxygen elements, wherein M' consists of Ni, Mn, Co and A, said positive electrode material having a Ni:(Mn+Co+A) molar ratio of $(1-x-y-z):(x+y+z)$ wherein $0.00 \leq x \leq 0.70$, $0.00 \leq y \leq 0.40$, and $0.00 \leq z \leq 0.10$ as measured by ICP, wherein A, when present, is different than Ni, Mn, Co and Li, and is preferably Al or at least one of: B, Mg, Al, Nb, Ti, Y, W, S, Ba, Sr, and Zr, and said polymer electrolyte being obtained by reaction between:

i. at least one polyether polymer [polymer (P), herein after], said polymer (P) comprising:
   a) at least 70.0% by moles of oxyethylene units (EO);
   b) from 0.0 to 10.0% by moles of oxypropylene units (PO); and
   c) from 1.00 to 4.0% by moles of recurring units derived from at least one monomer [hereafter, monomer (M)] of general formula (I) or of general formula (II):

formula (I)

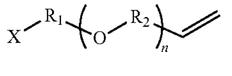

or formula (II)

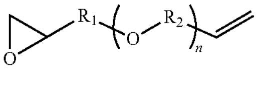

wherein each of $R_1$ and $R_2$, equal to or different from each other and at each occurrence, is $C_{1-6}$ alkanediyl wherein said $C_{1-6}$ alkanediyl, is optionally substituted with one or more substituents selected from halide, $C_{1-4}$ alkyl, $C_{3-6}$ cycloalkyl, $CF_3$, $OR_8$, and wherein each of $R_8$, equal to or different from each other and at each occurrence, is independently selected from the group hydrogen and $C_{1-4}$ alkyl; n is an integer 0 or 1 or 2;

each of X is a leaving group selected from the group consisting of halide, trifluoromethanesulfonate, nonafluorobutanesulfonate, p-toluenesulfonate and methanesulfonate;

and ii. at least one polysiloxane compound having the formula (III):

formula (III)

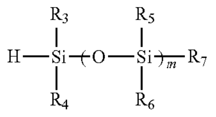

wherein each of $R_3$, $R_4$, $R_5$, $R_6$ and $R_7$, equal to or different from each other and at each occurrence, is independently selected from the group consisting of $C_{1-6}$ alkyl, $C_{3-6}$ cycloalkyl, aryl, $C_{1-6}$ alkoxy, heterocyclyl, wherein said $C_{1-6}$ alkyl, $C_{3-6}$ cycloalkyl, aryl, $C_{1-6}$ alkoxy, heterocyclyl are optionally substituted with one or more substituents selected from halide, $C_{1-4}$ alkyl, $C_{3-6}$ cycloalkyl, $CF_3$, $OR_9$, and wherein each of $R_9$, equal to or different from each other and at each occurrence, is independently selected from the group consisting of hydrogen, $C_{1-4}$ alkyl, and an hydroxyl protecting group, m is an integer of at least 3; and wherein said at least one polysiloxane compound having the formula (III) is grafted to said at least one polymer (P) through reaction of at least a fraction of the $—CH{=}CH_2$ moiety of monomer (M) with the H—Si moiety of the polysiloxane compound having the formula (III).

An embodiment of the is a battery or an electrochemical cell comprising a positive electrode active material and a polymer electrolyte, said positive electrode active material comprising Ni, Mn, Co and A, said positive electrode material having a Ni:(Mn+Co+A) molar ratio of $(1-x-y-z):(x+y+z)$ wherein $0.00 \leq x \leq 0.70$, $0.00 \leq y \leq 0.40$, and $0.00 \leq z \leq 0.10$ as measured by ICP, wherein A, when present, is different than Ni, Mn, Co and Li, and is preferably Al or at least one of: B, Mg, Al, Nb, Ti, Y, W, S, Ba, Sr, and Zr, and said polymer electrolyte being obtained by reaction between:

i. at least one polyether polymer [polymer (P), herein after], said polymer (P) comprising:
   a) at least 70.0% by moles of oxyethylene units (EO);
   b) from 0.0 to 10.0% by moles of oxypropylene units (PO); and
   c) from 1.00 to 4.0% by moles of recurring units derived from at least one monomer [hereafter, monomer (M)] of general formula (I) or of general formula (II):

formula (I)

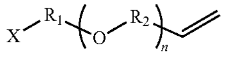

or formula (II)

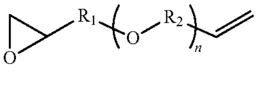

wherein each of $R_1$ and $R_2$, equal to or different from each other and at each occurrence, is $C_{1-6}$ alkanediyl wherein said $C_{1-6}$ alkanediyl, is optionally substituted with one or more substituents selected from halide, $C_{1-4}$ alkyl, $C_{3-6}$ cycloalkyl, $CF_3$, $OR_8$, and wherein each of $R_8$, equal to or different from each other and at each occurrence, is independently selected from the group hydrogen and $C_{1-4}$ alkyl; n is an integer 0 or 1 or 2;

each of X is a leaving group selected from the group consisting of halide, trifluoromethanesulfonate, nonafluorobutanesulfonate, p-toluenesulfonate and methanesulfonate;

and ii. at least one polysiloxane compound having the formula (III):

formula (III)

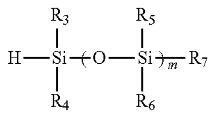

wherein each of $R_3$, $R_4$, $R_5$, $R_6$ and $R_7$, equal to or different from each other and at each occurrence, is independently selected from the group consisting of $C_{1-6}$ alkyl, $C_{3-6}$ cycloalkyl, aryl, $C_{1-6}$ alkoxy, heterocyclyl, wherein said $C_{1-6}$ alkyl, $C_{3-6}$ cycloalkyl, aryl, $C_{1-6}$ alkoxy, heterocyclyl are optionally substituted with one or more substituents selected from halide, $C_{1-4}$ alkyl, $C_{3-6}$ cycloalkyl, $CF_3$, $OR_9$, and wherein each of $R_9$, equal to or different from each other and at each occurrence, is independently selected from the group consisting of hydrogen, $C_{1-4}$ alkyl, and an hydroxyl protecting group, m is an integer of at least 3; and wherein said at least one polysiloxane compound having the formula (III) is grafted to said at least one polymer (P) through reaction of at least a fraction of the —CH═CH$_2$ moiety of monomer (M) with the H—Si moiety of the polysiloxane compound having the formula (III).

In a preferred embodiment, the battery is a lithium ion battery.

In a preferred embodiment, the battery or the electrochemical cell of the present invention comprises the polymer electrolyte, as described above-provided Positive electrode section.

Examples and Counter Examples

The following examples are intended to further clarify the present invention, and are not intended to limit the scope of the present invention.

1.1. Materials and Method

Unless specified otherwise, the following materials were used as described hereafter.

The random polymer (P) was purchased from Meisei Chemical works ltd under the tradename CP series CP-A. Alternatively, the polymer (P) can be prepared by following the procedure disclosed in H.-Q. Xie, J.-S. Guo, G.-Q. Yu, and J. Zu, *Journal of Applied Polymer Science* 2001, 80, 2446.

The monohydride terminated polydimethylsiloxane (SiH-terminated PDMS, $M_w$=850 g/mol) was purchased from Gelest, Inc.

Silica-supported Karsted-type catalyst were prepared according to Q. J. Miao, Z.-P. Fang, and G. P. Cai, Catalysis Communications 2003, 4, 637-639.

LiTFSI (lithium bis(trifluoromethanesulfonyl)imide salt, 99.95% trace metals basis) was purchased from Sigma-Aldrich.

Acetonitrile anhydrous 99.8 wt. % was purchased from Sigma-Aldrich.

Timcal Super P is a conductive carbon black powder (CAS no 1333-86-4) manufactured by Imerys Graphite & Carbon.

Polyethylene oxide (PEO having an $M_w$ of 1,000,000) was purchased from Alfa Aesar.

The 1H spectra were recorded at room temperature on a JEOL JNM ECZ 500 MHz NMR spectrometer. The polymer samples were dissolved in $CDCl_3$ and the internal standard was optimized by using tetramethylsilane (TMS).

The inductively coupled plasma (ICP) measurements were carried out using an Agilent 720 ICP-OES (*Agilent Technologies*, https://www.agilent.com/cs/library/brochures/5990-6497EN %20720-725_ICP-OES_LR.pdf). 1 gram of powder sample is dissolved into 50 mL of high purity hydrochloric acid (at least 37 wt. % of HCl with respect to the total weight of solution) in an Erlenmeyer flask. The flask is covered by a watch glass and heated on a hot plate at 380° C. until the powder is completely dissolved. After being cooled to room temperature, the solution from the Erlenmeyer flask is poured into a first 250 mL volumetric flask. Afterwards, the first volumetric flask is filled with deionized water up to the 250 mL mark, followed by a complete homogenization process (1$^{st}$ dilution). An appropriate amount of the solution from the first volumetric flask is taken out by a pipette and transferred into a second 250 mL volumetric flask for the 2$^{nd}$ dilution, where the second volumetric flask is filled with an internal standard element and 10% hydrochloric acid up to the 250 mL mark and then homogenized. Finally, this solution is used for ICP measurement.

1.2. Polymer Electrolyte Preparation

A Polymer (P), a random linear copolymer which characteristics are shown in table 2, is reacted with a monohydride terminated polydimethylsiloxane (SiH-terminated PDMS) by hydrosilylation according to the following procedure:

TABLE 2

| Polymer (P) | |
|---|---|
| Mol % of EO | 97.5% |
| Mol % of PO | 0.5% |
| Mol % of allyl glycidyl ether (AGE) | 1.9% |
| Mn (GPC using a PEO standards calibration) | 72 000 g/mol |

A mixture containing 2.0 g of the polymer (P) and 0.36 g of SiH-terminated PDMS is added into 50 mL benzene containing 20 mg of silica-supported Karsted-type catalyst and heated at 90° C. for 48 hours under nitrogen atmosphere. The heated mixture is filtered through celite to remove the solid catalyst, then placed under reduced pressure to remove the solvent. The PDMS was grafted to polymer (P) through reaction of 50% by moles of the —CH═CH$_2$ of AGE units with the H—Si moiety of the PDMS.

The successful grafting was confirmed by 1H-NMR and by GPC.

Polymer (P): 1H-NMR (TMS, $CDCl_3$, 500 MHz): δ (ppm) 1.2 (d, $CH_3$ of PO units), 4 (m, —OC$\underline{H_2}$—CH═$CH_2$ of the AGE units), 5.2 (m, C$\underline{H_2}$═CH— of AGE units), 5.8 (m, —C$\underline{H}$═$CH_2$ of AGE units).

Monohydride PDMS: 1H-NMR (TMS, $CDCl_3$, 500 MHz): δ (ppm) 0.5 (m, —Si—C$\underline{H_2}$—$CH_2$—), 0.9 (t, C$\underline{H_3}$—$CH_2$—), 1.3 (br, —Si—$CH_2$—C$\underline{H_2}$—C$\underline{H_2}$—$CH_3$), 4.8 (m, H—Si—).

Polymer electrolyte: 1H-NMR (TMS, $CDCl_3$, 500 MHz): δ (ppm): 0.5 (br, —Si—C$\underline{H_2}$—$CH_2$— of PDMS), 0.9 (br, C$\underline{H_3}$—$CH_2$— of PDMS), 1.1 (d, $CH_3$ of PO units), 1.2 (br, —Si—$CH_2$—C$\underline{H_2}$—C$\underline{H_2}$—$CH_3$ of PDMS), 1.4 (br, —$OCH_2$—C$\underline{H_2}$—$CH_2$—Si—).

The presence of the broad peak at 1.4 ppm and the absence of a peak attributed to H—Si in the polyelectrolyte $^1$H-NMR spectrum are the confirmation of a successful hydrosilylation.

FIG. 1 shows GPC elution curves of the polymer electrolyte as prepared above, polymer (P) and the polysiloxane.

The lower elution time of the polymer electrolyte in comparison to the polymer (P), indicates that the polymer electrolyte has a higher molecular weight than the polymer (P) and thus that the PDMS was successfully grafted onto the polymer (P).

The obtained polymer electrolyte was labelled PE1.

1.3. Positive Electrode Active Material 1 (AM1) Preparation

A lithium transition metal composite oxide having a general formula $Li_{1.010}(Ni_{0.621}Mn_{0.224}Co_{0.155})_{0.990}O_{2.00}$ as measured by ICP is prepared as a positive electrode active material according to the following process:

Step 1) Transition metal oxidized hydroxide precursor preparation: a nickel-based transition metal oxidized hydroxide powder (TMH2) having a metal composition of $Ni_{0.621}Mn_{0.224}Co_{0.155}$ as measured by ICP is prepared by a co-precipitation process in a large-scale continuous stirred tank reactor (CSTR) with mixed nickel manganese cobalt sulfates, sodium hydroxide, and ammonia.

Step 2) First mixing: the TMH1 prepared from Step 1) is mixed with $Li_2CO_3$ in an industrial blender so as to obtain a first mixture having a lithium to metal ratio of 0.85.

Step 3) First firing: the first mixture from Step 2) is fired at 900° C. for 10 hours in dry air atmosphere so as to obtain a first fired cake. The first fired cake is ground so as to obtain a first fired powder.

Step 4) Second mixing: the first fired powder from Step 3) is mixed with LiOH in an industrial blender so as to obtain a second mixture having a lithium to metal ratio of 1.01.

Step 5) Second firing: the second mixture from Step 4) is fired at 930° C. for 10 hours in dry air, followed by a crushing (bead milling) and sieving process so as to obtain a second fired powder.

Step 6) Third mixing: the second fired powder from Step 5) is mixed with 1.5 mol % of LiOH with respect to the total molar contents of Ni, Mn, and Co in an industrial blender so as to obtain a third mixture.

Step 7) Third firing: the third mixture from Step 6) is fired at 750° C. for 10 hours in dry air so as to obtain AM1.

1.4. Positive Electrode EX1 Preparation

A positive electrode comprising PE1 and AM1, is prepared according to the following procedure:

Step 1) Preparing a polymer electrolyte solution comprising the polymer electrolyte PE1 and LiTFSI in acetonitrile anhydrous 99.8 wt. %. The polymer electrolyte solution has a ratio of the polymer electrolyte:LiTFSI of 74:26 by weight. This weight ration corresponds to a LiTFSI:polymer electrolyte [weight ratio×100] of 35%.

Step 2) Mixing a polymer electrolyte solution prepared from Step 1), a positive electrode active material AM1 prepared according to section 1.2, and a carbon black powder (Timcal Super P carbon black) in acetonitrile solution with a ratio of 21:75:4 by weight so as to prepare a slurry mixture. The mixing is performed by a homogenizer for 45 minutes at 5000 rpm.

Step 3) Casting the slurry mixture from Step 2) on one side of an 20 μm-thick aluminum foil with 100 μm coater gap.

Step 4) Drying the slurry-casted foil at 30° C. for 12 hours followed by punching in order to obtain positive electrodes having a diameter of 14 mm.

The positive electrode was labeled EX1.

1.5. Positive Electrode Active Material 2 (AM2) Preparation

A positive electrode active material AM2 is prepared according to the following process: Step 1) Transition metal oxidized hydroxide precursor preparation: A nickel-based transition metal oxidized hydroxide powder (TMH1) having a metal composition of $Ni_{0.63}Mn_{0.22}Co_{0.15}$ as measured by ICP is prepared by a co-precipitation process in a large-scale continuous stirred tank reactor (CSTR) with mixed nickel manganese cobalt sulfates, sodium hydroxide, and ammonia.

Step 2) First mixing: the TMH1 prepared from Step 1) is mixed with $Li_2CO_3$ in an industrial blender so as to obtain a first mixture having a lithium to metal ratio of 0.85.

Step 3) First firing: the first mixture from Step 2) is fired at 900° C. for 10 hours in dry air atmosphere so as to obtain a first fired cake. The first fired cake is grinded so as to obtain a first fired powder.

Step 4) Second mixing: the first fired powder from Step 3) is mixed with LiOH in an industrial blender so as to obtain a second mixture having a lithium to metal ratio of 1.05.

Step 5) Second firing: the second mixture from Step 4) is fired at 930° C. for 10 hours in dry air, followed by a crushing (bead milling) and sieving process so as to obtain a second fired powder.

Step 6) Third mixing: the second fired powder from Step 5) is mixed with 2 mol % of Co, for example from $Co_3O_4$ powder, and 5 mol % of LiOH with respect to the total molar contents of Ni, Mn, and Co in an industrial blender so as to obtain a third mixture.

Step 7) Third firing: the third mixture from Step 6) is fired at 775° C. for 12 hours in dry air so as to produce a third fired powder.

Step 8) Fourth mixing: the third fired powder from Step 7) is mixed with 0.2 wt. % of nano $Al_2O_3$ powder.

Step 9) Fourth firing: the fourth mixture from Step 8) is fired at 750° C. for 10 hours in dry air so as to produce a fourth fired powder.

Step 10) Fifth mixing: the fourth fired powder from Step 9) is mixed with 0.3 wt. % of polyvinylidene fluoride (PVDF).

Step 11) Fifth firing: the fifth mixture from Step 10) is fired at 375° C. for 5 hours in dry air so as to produce AM2.

1.6. Positive Electrode EX2 Preparation

A positive electrode comprising AM2 and PE1, is prepared according to the following procedure:

Step 1) Preparing a polymer electrolyte solution comprising the polymer electrolyte PE1 and LiTFSI in acetonitrile anhydrous 99.8 wt. %. The polymer electrolyte solution has a ratio of the polymer electrolyte:LiTFSI of 74:26 by weight.

Step 2) Mixing a polymer electrolyte solution prepared from Step 1), a positive electrode active material AM2, and a carbon black powder (Timcal Super P carbon black) in acetonitrile solution with a ratio of 21:75:4 by weight so as to prepare a slurry mixture. The mixing is performed by a homogenizer for 45 minutes at 5000 rpm.

Step 3) Casting the slurry mixture from Step 2) on one side of an 20 μm-thick aluminum foil with 100 μm coater gap.

Step 4) Drying the slurry-casted foil at 30° C. for 12 hours followed by punching in order to obtain positive electrodes having a diameter of 14 mm.

The positive electrode was labeled EX2.

1.7. Positive Electrode CEX1 Preparation

A positive electrode comprising PE2 (A poly(ethylene oxide) (PEO) powder purchased from Alfa Aesar (Mw of 1,000,000 g/mol)) and AM1 is prepared according to the process as follows:

Step 1) Preparing a polymer electrolyte solution comprising a polymer electrolyte (PE2) and LiTFSI, in acetonitrile anhydrous 99.8 wt. %. The polymer electrolyte solution has a ratio of the polymer electrolyte:LiTFSI of 74:26 by weight.

Step 2) Mixing a polymer electrolyte solution prepared from Step 1), a positive electrode active material AM1, and a conductor powder (Super P, Timcal (Imerys Graphite & Carbon), in acetonitrile solution with a ratio of 21:75:4 by weight so as to prepare a slurry mixture. The mixing is performed by a homogenizer for 45 minutes at 5,000 rpm.

Step 3) Casting the slurry mixture from Step 2) on one side of an 20 μm-thick aluminum foil with 100 μm coater gap.

Step 4) Drying the slurry-casted foil at 30° C. for 12 hours followed by punching in order to obtain positive electrodes having a diameter of 14 mm.

The positive electrode was labeled CEX1.

1.8. Solid Polymer Electrolyte (SPE) Preparation

A PEO-based solid polymer electrolyte (SPE) is prepared according to the process as follows:

Step 1) Mixing polyethylene oxide (PEO having a molecular weight of 1,000,000) with LiTFSI (purchased from Soulbrain Co., Ltd. instead of Sigma Aldrich) in acetonitrile anhydrous 99.8 wt. %, using a mixer for 30 minutes at 2,000 revolutions per minute (rpm). The molar ratio of ethylene oxide to lithium is 20.

Step 2) Pouring the mixture from Step 1) into a Teflon dish and dried in 25° C. for 12 hours.

Step 3) Detaching the dried SPE from the dish and punching the dried SPE in order to obtain SPE disks having a thickness of 300 μm and a diameter of 19 mm.

1.9. Polymer Cell Assembling

The coin-type polymer cell is assembled in an argon-filled glovebox with an order from bottom to top: a 2032 coin cell can, a positive electrode (EX1, EX2 or CEX1), a SPE prepared from section 1.8, a gasket, a Li anode, a spacer, a wave spring, and a cell cap. Then, the coin cell is completely sealed to prevent leakage of the electrolyte.

2. Comparison and Testing Method (Qtotal)

The capacity leaked (Qtotal) was measured for EX1, EX2 and CEX1.

Each coin-type polymer cell is cycled at 80° C. using a Toscat-3100 computer-controlled galvanostatic cycling stations (from Toyo, http://www.toyosystem.com/image/menu3/toscat/TOSCAT-3100.pdf). The coin cell testing procedure uses a 1 C current definition of 160 mA/g in the 4.4-3.0 V/Li metal window range according to the schedule below:

Step 1) Charging in a constant current mode with C-rate of 0.05 with an end condition of 4.4 V followed by 10 minutes rest.

Step 2) Discharging in a constant current mode with C-rate of 0.05 with an end condition of 3.0 V followed by 10 minutes rest.

Step 3) Charging in a constant current mode with C-rate of 0.05 with an end condition of 4.4 V.

Step 4) Switching to a constant voltage mode and keeping 4.4 V for 60 hours.

Step 5) Discharging in a constant current mode with C-rate of 0.05 with an end condition of 3.0 V.

$Q_{total}$ is defined as the total leaked capacity at the high voltage and high temperature in the Step 4) according to the described testing method. A low value of $Q_{total}$ indicates a high stability of the positive electrode active material powder during a high temperature operation.

TABLE 3

Summary of positive electrode information of examples and a comparative example

| Positive Electrode ID | Positive electrode active material ID | Polymer electrolyte ID |
|---|---|---|
| EX1 | AM1 | PE1 |
| EX2 | AM2 | PE1 |
| CEX1 | AM1 | PE2 (PEO) |

TABLE 4

ICP results of positive electrode active materials

| Positive electrode | Composition [a] | | | |
|---|---|---|---|---|
| active material ID | Ni/Me | Mn/Me | Co/Me | Al/Me |
| AM1 | 0.621 | 0.224 | 0.155 | 0.000 |
| AM2 | 0.604 | 0.218 | 0.171 | 0.007 |

[a] as determined by ICP measurement, Me is a total atomic fraction of Ni + Mn + Co + Al

TABLE 5

Summary of the $Q_{total}$ of examples and a comparative example

| Positive electrode ID | $Q_{total}$ (mAh/g) |
|---|---|
| EX1 | 60.34 |
| EX2 | 29.79 |
| CEX1 | 72.83 |

Figure 2:
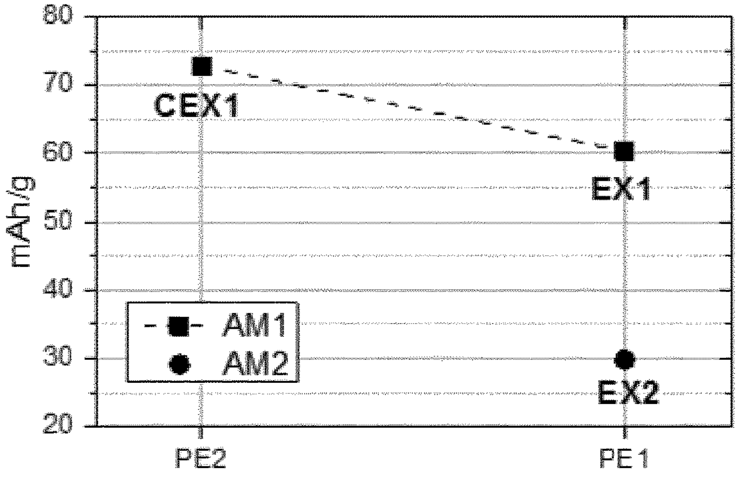
FIG. 2 is a graph that shows the effect of the polymer electrolyte according to this invention on the $Q_{total}$ value.

FIG. 2 shows the effect of the polymer electrolyte according to this invention on the $Q_{total}$ value. X-axis indicates the used polymer electrolyte in a positive electrode. The legend indicates the used positive electrode active material.

According to table 5 and FIG. 2, it is observed that EX1 has a lower $Q_{total}$ than CEX1. This observation indicates that the positive electrode comprising the combination of the positive electrode active material and the polymer electrolyte according to the present invention provides a better electrochemical performance than the combination with PEO which is a conventional electrolyte. Furthermore, the surface modified positive electrode active material powders according to this invention (EX2) have a better electrochemical performance with use of PE1 as a polymer electrolyte than EX1. A low value of $Q_{total}$ indicates a high stability for the lithium-ion secondary batteries in the high voltage application at a high temperature.

3. Characterization of the Polymer Electrolyte and the Positive Electrode Material Contained in the Positive Electrode The solid polymer electrolyte and the positive electrode material can be separated from each other by selectively dissolving the solid polymer electrolyte in a solvent, such as DMSO, DMF or acetonitrile, followed by separation of the liquid phase comprising the solid polymer electrolyte and the solid components comprising the positive electrode material through filtration or centrifugation. Drying of the liquid phase results in the solid polymer electrolyte, which can be characterized through NMR spectroscopy as described under Example 1.2. Optionally, the solid polymer electrolyte needs be purified through precipitation in a non-solvent such as hexane or cyclohexane followed by filtering and drying. ICP analysis of solid components will reveal that the solid components comprises a metal composition as determined in Table 4 for AM1 or AM2 respectively.

The invention claimed is:

1. A positive electrode for lithium-ion secondary batteries, comprising a positive electrode active material and at least one polymer electrolyte, said positive electrode active material comprising Ni, Mn, Co and A, said positive electrode material having a Ni:(Mn+Co+A) molar ratio of (1-x-y-z):(x+y+z) wherein 0.00≤x≤0.70, 0.00≤y≤0.40, and 0.00≤z≤0.10 as measured by ICP, wherein A, when present, is different than Ni, Mn, Co and Li, and is at least one of: B, Mg, Al, Nb, Ti, Y, W, S, Ba, Sr, and Zr, and said polymer electrolyte being obtained by reaction between:

i. at least one polyether polymer [hereinafter polymer (P)], said polymer (P) comprising:

at least 70.0% by moles of oxyethylene units (EO);

from 0.0 to 10.0% by moles of oxypropylene units (PO); and from 1.00 to 4.0% by moles of recurring units derived from at least one monomer [hereafter, monomer (M)] of general formula (I) or of general formula (II):

formula (I)

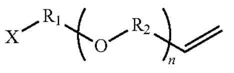

or formula (II)

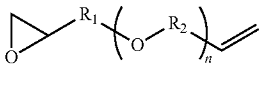

wherein each of $R_1$ and $R_2$, equal to or different from each other and at each occurrence, is $C_{1-6}$ alkanediyl wherein said $C_{1-6}$ alkanediyl, is optionally substituted with one or more substituents selected from halide, $C_{1-4}$ alkyl, $C_{3-6}$ cycloalkyl, $CF_3$, $OR_8$, and wherein each of $R_8$, equal to or different from each other and at each occurrence, is independently selected from the group consisting of hydrogen and $C_{1-4}$ alkyl; n is an integer 0 or 1 or 2;

each of X is a leaving group selected from the group consisting of halide, trifluoromethanesulfonate, nonafluorobutanesulfonate, p-toluenesulfonate and methanesulfonate; and ii. at least one polysiloxane compound having the formula (III):

formula (III)

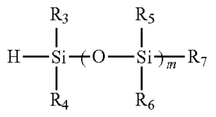

wherein each of $R_3$, $R_4$, $R_5$, $R_6$ and $R_7$, equal to or different from each other and at each occurrence, is independently selected from the group consisting of $C_{1-6}$ alkyl, $C_{3-6}$ cycloalkyl, aryl, $C_{1-6}$ alkoxy, heterocyclyl, wherein said $C_{1-6}$ alkyl, $C_{3-6}$ cycloalkyl, aryl, $C_{1-6}$ alkoxy, and heterocyclyl are optionally substituted with one or more substituents selected from halide, $C_{1-4}$ alkyl, $C_{3-6}$ cycloalkyl, $CF_3$, and $OR_8$, and wherein each of $R_9$, equal to or different from each other and at each occurrence, is independently selected from the group consisting of hydrogen, $C_{1-4}$ alkyl, and an hydroxyl protecting group, m is an integer of at least 3; and wherein said at least one polysiloxane compound having the formula (III) is grafted to said at least one polymer (P) through reaction of at least a fraction of the —CH—$CH_2$ moiety of monomer (M) with the H—Si moiety of the polysiloxane compound having the formula (III).

2. The positive electrode according to claim 1, wherein from 80.0% by moles to 99.0% by moles of the recurring units of the polymer (P) are EO units.

3. The positive electrode according to claim 1, wherein from 0.5% by moles to 6.0% by moles of the recurring units of the polymer (P) are PO units.

4. The positive electrode according to claim 1, wherein from 1.2% by moles to 4.0% by moles of the recurring units of the polymer (P) are recurring units derived from the monomer (M) of general formula (I) or of general formula (II) wherein $R_1$, $R_2$, n and X are as defined in claim 1.

5. The positive electrode according to claim 1, wherein the monomer (M) is of formula (II)

formula (II)

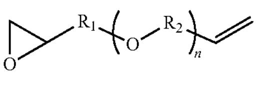

wherein each of $R_1$ and $R_2$, equal to or different from each other and at each occurrence, is a $C_{1-2}$ alkanediyl and n is an integer 0 or 1.

6. The positive electrode according to claim 1, wherein each of $R_3$, $R_4$, and $R_7$, equal to or different from each other and at each occurrence, is independently $C_{1-6}$ alkyl; each of $R_5$ and $R_6$, equal to or different from each other and at each occurrence, is independently selected from $C_{1-4}$ alkyl or phenyl, wherein said $C_{1-4}$ alkyl is optionally substituted with one or more substituents selected from halide, $C_{1-4}$ alkyl, and $CF_3$; m is an integer of at least 5 and at most 1000.

7. The positive electrode according to claim 1, wherein the polysiloxane compound having formula (III) is grafted to polymer (P) through reaction of at least 10% and at most 90% by moles of the —CH═$CH_2$ moiety of monomer (M) with the H—Si moiety of the polysiloxane compound having the formula (III).

8. The positive electrode according to claim 1, wherein the weight ratio of the polymer electrolyte to the positive electrode active material is between 5% and 50%.

9. The positive electrode according to claim 1, wherein the positive electrode further comprises at least one lithium salt selected from: LiTFSI, LiFSI, $LiPF_6$, $LiBF_4$, and $LiClO_4$.

10. The positive electrode according to claim 1, wherein A is Al and the atomic ratio of A to the total amount of Ni, Mn, and/or Co is higher than 0.

11. A polymer battery comprising the positive electrode according to claim 1.

12. An electrochemical cell comprising the positive electrode according to claim 1.

13. A battery comprising the electrochemical cell according to claim 12.

14. A battery or an electrochemical cell comprising a positive electrode active material and a polymer electrolyte, said positive electrode active material comprising Ni, Mn, Co and A, said positive electrode material having a Ni:(Mn+Co+A) molar ratio of (1-x-y-z):(x+y+z) wherein $0.00 \leq x \leq 0.70$, $0.00 \leq y \leq 0.40$, and $0.00 \leq z \leq 0.10$ as measured by ICP, wherein A, when present, is different than Ni, Mn, Co and Li, and is at least one of: B, Mg, Al, Nb, Ti, Y, W, S, Ba, Sr, and Zr, and said polymer electrolyte being obtained by reaction between:

i. at least one polyether polymer [hereinafter polymer (P)], said polymer (P) comprising:
   at least 70.0% by moles of oxyethylene units (EO);
   from 0.0 to 10.0% by moles of oxypropylene units (PO); and
   from 1.00 to 4.0% by moles of recurring units derived from at least one monomer [hereafter, monomer (M)] of general formula (I) or of general formula (II):

formula (I)

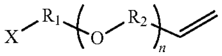

or formula (II)

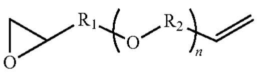

wherein each of $R_1$ and $R_2$, equal to or different from each other and at each occurrence, is $C_{1-6}$ alkanediyl wherein said $C_{1-6}$ alkanediyl, is optionally substituted with one or more substituents selected from halide, $C_{1-4}$ alkyl, $C_{3-6}$ cycloalkyl, $CF_3$, and $OR_8$, and wherein each of $R_8$, equal to or different from each other and at each occurrence, is independently selected from the group consisting of hydrogen and $C_{1-4}$ alkyl; n is an integer 0 or 1 or 2;

each of X is a leaving group selected from the group consisting of halide, trifluoromethanesulfonate, nonafluorobutanesulfonate, p-toluenesulfonate and methanesulfonate;

and ii. at least one polysiloxane compound having the formula (III):

formula (III)

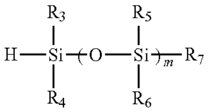

wherein each of $R_3$, $R_4$, $R_5$, $R_6$ and $R_7$, equal to or different from each other and at each occurrence, is independently selected from the group consisting of $C_{1-6}$ alkyl, $C_{3-6}$ cycloalkyl, aryl, $C_{1-6}$ alkoxy, and heterocyclyl, wherein said $C_{1-6}$ alkyl, $C_{3-6}$ cycloalkyl, aryl, $C_{1-6}$ alkoxy, heterocyclyl are optionally substituted with one or more substituents selected from halide, $C_{1-4}$ alkyl, $C_{3-6}$ cycloalkyl, $CF_3$, and $OR_9$, and wherein each of $R_9$, equal to or different from each other and at each occurrence, is independently selected from the group consisting of hydrogen, $C_{1-4}$ alkyl, and a hydroxyl protecting group, m is an integer of at least 3; and wherein said at least one polysiloxane compound having the formula (III) is grafted to said at least one polymer (P) through reaction of at least a fraction of the —CH═$CH_2$ moiety of monomer (M) with the H—Si moiety of the polysiloxane compound having the formula (III).

15. Battery or electrochemical cell according to claim 14, comprising at least one lithium salt selected from: LiTFSI, LiFSI, $LiPF_6$, $LiBF_4$, and $LiClO_4$.

16. The positive electrode according to claim 1, wherein A is Al.

17. The battery or electrochemical cell according to claim 14, wherein A is Al.

* * * * *